United States Patent
Yamada

(10) Patent No.: US 6,339,485 B1
(45) Date of Patent: Jan. 15, 2002

(54) METHOD OF MAKING PHOTOPROCESSING REFERENCE IMAGE CONTROL TOOL PHOTOGRAPH AND METHODS OF CONVERTING IMAGE DATA

(75) Inventor: Makoto Yamada, Kanagawa-ken (JP)

(73) Assignee: Fuji Photo Film Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/228,397

(22) Filed: Jan. 12, 1999

(30) Foreign Application Priority Data

Jan. 12, 1998 (JP) .......................... 10-004066
Sep. 25, 1998 (JP) .......................... 10-270711

(51) Int. Cl.[7] .......................... H04N 1/46; H04N 1/00; H04N 1/21; H04N 1/23
(52) U.S. Cl. .................. 358/504; 358/302; 358/406; 355/77
(58) Field of Search ................. 358/406, 504, 358/518, 909.1, 296, 302, 523, 527; 355/32, 35, 77

(56) References Cited

U.S. PATENT DOCUMENTS 5,223,891 A * 6/1993 Fierstein et al. .............. 355/77
5,313,251 A * 5/1994 Fierstein et al. .............. 355/77
5,883,699 A * 3/1999 Kuramitsu et al. ........... 355/77
6,154,272 A * 11/2000 Vanderbrook ................ 355/77

FOREIGN PATENT DOCUMENTS

| JP | 9-15760 | 1/1997 | ........... G03B/27/72 |
| JP | 9-15761 | 1/1997 | ........... G03B/27/72 |
| WO | WO 92/15957 | 9/1992 | ........... G06F/15/62 |

\* cited by examiner

Primary Examiner—Kimberly A. Williams
(74) Attorney, Agent, or Firm—Sughrue Mion, PLLC

(57) ABSTRACT

A method of making a photoprocessing reference image control tool photograph includes the steps of recording an image onto film of a first type, reading digital image data from the film, recording images of a color chart onto film of the first type and film of a second type, reading the color chart images to obtain first and second digital chart image data, determining a correspondence relationship defining correspondence of the digital values, converting the digital image data using the correspondence relationship to obtain converted image data, and reproducing the converted image data to obtain a photoprocessing reference image control tool photograph.

11 Claims, 3 Drawing Sheets

FIG.3

| MUNSELL CODE OF COLOR CHIP | MATERIAL A DENSITIES | | | MATERIAL B DENSITIES | | | MATRIX CONVERSION VALUES FOR MATERIAL A DENSITIES | | | DENSITY VALUES | | |
|---|---|---|---|---|---|---|---|---|---|---|---|---|
| | B | G | R | B | G | R | B | G | R | B | G | R |
| 5R4/2 | 1.73 | 1.33 | 1.02 | 1.57 | 1.29 | 0.92 | 1.57 | 1.28 | 0.92 | 0.00 | -0.01 | 0.00 |
| 5R4/10 | 1.51 | 1.02 | 1.34 | 1.37 | 1.03 | 1.17 | 1.38 | 1.03 | 1.16 | 0.01 | -0.01 | -0.01 |
| 5YR7/2 | 2.04 | 1.70 | 1.33 | 1.82 | 1.65 | 1.21 | 1.83 | 1.65 | 1.20 | 0.02 | 0.00 | -0.02 |
| 5YR7/10 | 1.62 | 1.66 | 1.60 | 1.53 | 1.60 | 1.44 | 1.51 | 1.59 | 1.44 | -0.02 | -0.01 | 0.00 |
| 5T8/1 | 2.18 | 1.84 | 1.39 | 1.92 | 1.79 | 1.26 | 1.94 | 1.78 | 1.25 | 0.02 | 0.00 | -0.01 |
| 5Y8/8 | 1.69 | 1.92 | 1.53 | 1.58 | 1.85 | 1.36 | 1.58 | 1.84 | 1.36 | 0.00 | -0.01 | 0.00 |
| 5GY7/1 | 2.06 | 1.74 | 1.26 | 1.85 | 1.68 | 1.15 | 1.85 | 1.68 | 1.14 | 0.00 | 0.00 | -0.01 |
| 5GY7/6 | 1.76 | 1.85 | 1.26 | 1.63 | 1.78 | 1.13 | 1.63 | 1.77 | 1.12 | 0.00 | -0.01 | -0.01 |
| 5G4/2 | 1.70 | 1.41 | 0.81 | 1.55 | 1.34 | 0.75 | 1.54 | 1.34 | 0.74 | -0.01 | 0.00 | -0.01 |
| 5G4/6 | 1.60 | 1.55 | 0.64 | 1.48 | 1.46 | 0.59 | 1.46 | 1.47 | 0.62 | -0.02 | 0.01 | 0.03 |
| 5BG4/2 | 1.74 | 1.39 | 0.76 | 1.57 | 1.33 | 0.72 | 1.56 | 1.33 | 0.71 | -0.01 | 0.00 | -0.01 |
| 5BG4/6 | 1.79 | 1.52 | 0.61 | 1.61 | 1.43 | 0.57 | 1.59 | 1.44 | 0.59 | -0.02 | 0.01 | 0.02 |
| 5B4/2 | 1.88 | 1.41 | 0.82 | 1.67 | 1.35 | 0.76 | 1.67 | 1.35 | 0.76 | 0.00 | 0.00 | 0.00 |
| 5B4/6 | 1.99 | 1.49 | 0.67 | 1.74 | 1.40 | 0.62 | 1.75 | 1.42 | 0.65 | 0.01 | 0.02 | 0.03 |
| 5PB4/1 | 1.85 | 1.38 | 0.92 | 1.65 | 1.33 | 0.83 | 1.66 | 1.33 | 0.84 | 0.01 | 0.00 | 0.01 |
| 5PB4/8 | 2.10 | 1.38 | 0.72 | 1.82 | 1.32 | 0.67 | 1.83 | 1.33 | 0.69 | 0.01 | 0.01 | 0.02 |
| 5P4/1 | 1.85 | 1.39 | 0.98 | 1.66 | 1.35 | 0.89 | 1.66 | 1.34 | 0.89 | 0.00 | -0.01 | 0.00 |
| 5P4/8 | 2.05 | 1.25 | 1.08 | 1.80 | 1.24 | 0.98 | 1.81 | 1.24 | 0.98 | 0.01 | 0.00 | 0.00 |
| 5RP4/2 | 1.77 | 1.35 | 1.03 | 1.62 | 1.32 | 0.94 | 1.61 | 1.30 | 0.93 | -0.01 | -0.02 | -0.01 |
| 5RP4/10 | 1.86 | 1.06 | 1.26 | 1.65 | 1.09 | 1.13 | 1.66 | 1.09 | 1.11 | 0.01 | 0.00 | -0.02 |
| N2 | 2.37 | 1.99 | 1.52 | 2.09 | 1.93 | 1.37 | 2.08 | 1.93 | 1.37 | -0.01 | 0.00 | 0.00 |
| N4 | 2.19 | 1.81 | 1.34 | 1.95 | 1.74 | 1.21 | 1.95 | 1.75 | 1.20 | 0.00 | 0.01 | -0.01 |
| N6 | 1.92 | 1.54 | 1.09 | 1.73 | 1.49 | 0.99 | 1.73 | 1.48 | 0.99 | 0.00 | -0.01 | 0.00 |
| N8 | 1.59 | 1.21 | 0.77 | 1.44 | 1.15 | 0.70 | 1.43 | 1.15 | 0.69 | -0.01 | 0.00 | -0.01 |

FIG.4

| MUNSELL CODE OF COLOR CHIP | MATERIAL A DENSITIES | | | MATERIAL B DENSITIES | | | MATRIX CONVERSION VALUES FOR MATERIAL A DENSITIES | | | DENSITY VALUES | | |
|---|---|---|---|---|---|---|---|---|---|---|---|---|
| | B | G | R | B | G | R | B | G | R | B | G | R |
| 5R4/2 | 1.73 | 1.33 | 1.02 | 1.66 | 1.40 | 0.90 | 1.68 | 1.41 | 0.91 | 0.02 | 0.01 | 0.01 |
| 5R4/10 | 1.51 | 1.02 | 1.34 | 1.48 | 1.12 | 1.30 | 1.48 | 1.11 | 1.25 | 0.00 | -0.01 | -0.05 |
| 5YR7/2 | 2.04 | 1.70 | 1.33 | 1.93 | 1.71 | 1.19 | 1.94 | 1.72 | 1.18 | 0.02 | 0.01 | -0.01 |
| 5YR7/10 | 1.62 | 1.66 | 1.60 | 1.56 | 1.62 | 1.51 | 1.57 | 1.61 | 1.54 | 0.02 | -0.01 | 0.04 |
| 5T8/1 | 2.18 | 1.84 | 1.39 | 2.04 | 1.82 | 1.22 | 2.06 | 1.84 | 1.22 | 0.02 | 0.02 | -0.01 |
| 5Y8/8 | 1.69 | 1.92 | 1.53 | 1.58 | 1.86 | 1.34 | 1.58 | 1.85 | 1.35 | 0.00 | -0.01 | 0.01 |
| 5GY7/1 | 2.06 | 1.74 | 1.26 | 1.96 | 1.76 | 1.10 | 1.95 | 1.76 | 1.10 | -0.01 | 0.01 | 0.01 |
| 5GY7/6 | 1.76 | 1.85 | 1.26 | 1.66 | 1.84 | 1.06 | 1.65 | 1.85 | 1.05 | -0.01 | 0.01 | -0.01 |
| 5G4/2 | 1.70 | 1.41 | 0.81 | 1.66 | 1.50 | 0.72 | 1.65 | 1.51 | 0.73 | -0.01 | 0.01 | 0.01 |
| 5G4/6 | 1.60 | 1.55 | 0.64 | 1.55 | 1.67 | 0.56 | 1.55 | 1.68 | 0.61 | 0.00 | 0.01 | 0.05 |
| 5BG4/2 | 1.74 | 1.39 | 0.76 | 1.69 | 1.52 | 0.70 | 1.69 | 1.51 | 0.70 | 0.00 | -0.01 | 0.00 |
| 5BG4/6 | 1.79 | 1.52 | 0.61 | 1.73 | 1.64 | 0.55 | 1.73 | 1.65 | 0.61 | 0.00 | 0.01 | 0.05 |
| 5B4/2 | 1.88 | 1.41 | 0.82 | 1.80 | 1.52 | 0.73 | 1.82 | 1.52 | 0.75 | 0.02 | 0.00 | 0.01 |
| 5B4/6 | 1.99 | 1.49 | 0.67 | 1.91 | 1.61 | 0.61 | 1.93 | 1.61 | 0.65 | 0.01 | 0.00 | 0.04 |
| 5PB4/1 | 1.85 | 1.38 | 0.92 | 1.78 | 1.48 | 0.82 | 1.79 | 1.47 | 0.82 | 0.01 | -0.01 | 0.01 |
| 5PB4/8 | 2.10 | 1.38 | 0.72 | 2.03 | 1.51 | 0.67 | 2.05 | 1.50 | 0.69 | 0.02 | -0.01 | 0.02 |
| 5P4/1 | 1.85 | 1.39 | 0.98 | 1.78 | 1.48 | 0.88 | 1.79 | 1.47 | 0.88 | 0.01 | -0.01 | 0.00 |
| 5P4/8 | 2.05 | 1.25 | 1.08 | 2.00 | 1.35 | 1.00 | 1.99 | 1.34 | 0.97 | -0.01 | -0.01 | -0.04 |
| 5RP4/2 | 1.77 | 1.35 | 1.03 | 1.75 | 1.46 | 0.95 | 1.72 | 1.43 | 0.92 | -0.03 | -0.03 | -0.02 |
| 5RP4/10 | 1.86 | 1.06 | 1.26 | 1.84 | 1.17 | 1.23 | 1.80 | 1.14 | 1.14 | -0.04 | 0.01 | -0.09 |
| N2 | 2.37 | 1.99 | 1.52 | 2.24 | 1.98 | 1.35 | 2.22 | 1.96 | 1.33 | -0.03 | -0.01 | -0.02 |
| N4 | 2.19 | 1.81 | 1.34 | 2.07 | 1.79 | 1.17 | 2.07 | 1.82 | 1.16 | -0.01 | 0.03 | -0.01 |
| N6 | 1.92 | 1.54 | 1.09 | 1.86 | 1.61 | 0.97 | 1.85 | 1.60 | 0.96 | 0.00 | -0.01 | 0.00 |
| N8 | 1.59 | 1.21 | 0.77 | 1.55 | 1.33 | 0.70 | 1.56 | 1.33 | 0.70 | 0.01 | 0.00 | 0.00 |

METHOD OF MAKING PHOTOPROCESSING REFERENCE IMAGE CONTROL TOOL PHOTOGRAPH AND METHODS OF CONVERTING IMAGE DATA

BACKGROUND OF THE INVENTION

1. Field of the Invention

This invention relates to a method of making a photoprocessing reference image control tool photograph and methods of converting image data, particularly to a method of making a photoprocessing reference image control tool photograph suitable for use in setting the exposure conditions and checking the development performance of an automatic printer or print processor capable of printing an image recorded onto photographic film (a silver halide photographic recording medium) on printing paper (a silver halide photographic recording medium) under automatically controlled exposure conditions and to methods of converting image data that utilize this method.

2. Description of the Related Art

The automatic printer and the automatic print processor (a printer with development processing capability) are devices for automatically printing images recorded using color negative film on color printing paper to obtain color prints (positive images). Proper development processing and proper setting of the automatic printer exposure conditions are essential for consistently obtaining high quality color prints. The automatic printer has a slope control feature that effects correction to make the density and color balance of the finished print the same irrespective of the negative image contrast (underexposure, proper exposure or overexposure). A type of control negative called an eyeball negative is generally used to adjust the slope control and set the exposure conditions. The eyeball negative is produced by effecting exposure to obtain a portion at the center corresponding to a negative obtained by photographing a round gray subject and a surrounding portion corresponding to a negative obtained by photographing a green subject.

The relationship with the photographed subject is indefinite with the eyeball negative, however, because only the portion corresponding to a negative obtained by photographing a round gray subject is imaged at the center portion. The eyeball negative is therefore hard to use.

In response to this situation, PCT Japanese Publication No. 5(1993)-506733 corresponding to WO92/15957 teaches a method of producing a second-generation camera original photoprocessing reference image control tool photograph that utilizes a transparency photograph digitally generated to represent the actual scene. This method photographs a first image including a preselected scene and subject onto a first photographic recording medium and photographs a second image representing photographic processing control data on a second photographic recording medium. It next converts the first and second images to first and second numerical images and stores them in the primary digital image datametric of a digital image database. It then digitally inserts the second numerical image into the first numerical image to generate composite digital image data and selectively adjusts one or more parameters of the composite image. Finally, it uses a digital output recording apparatus to record the composite image onto a photographic recording medium, photographs the composite image recorded onto the photographic recording medium and develops the obtained composite image photograph to obtain a photoprocessing reference image control tool photograph.

The photoprocessing reference image control tool photograph is used in the following manner to set the exposure conditions of a printer. First, photoprocessing reference image control tool photographs are produced in correspondence to the cases of overexposure, underexposure and proper-exposure photography. The produced tools are then used to form photoprocessing reference image control tool photograph images on light-sensitive material. At this time, the exposure conditions are set to give the gray portion of each photoprocessing reference image control tool photograph a prescribed density. Some fine adjustment of the exposure conditions may be necessary to obtain naturallooking flesh portions, however, because such portions may in some cases be rendered in the wrong density if the gray portion is given the prescribed density. The exposure conditions are stored in memory. At the time of printing, the exposure conditions are set based on the relationship between the overall density of the film and the density of the photoprocessing reference image control tool photographs. Printed images (prints) are made using these exposure conditions. The printed image obtained by this method exhibits proper density of the gray portions and the flesh portions. (The exposure condition settings are those in the case where image formation on the light-sensitive material was conducted using standard exposure conditions. In the case of a light-sensitive material exposed using conditions other than standard, such as by use of a nonstandard exposure light source, separate corrective adjustment is necessary.)

This prior art method photographs the second image with a camera and then converts it to a numerical image by photographic numerical conversion. This need to conduct two steps, image taking and numerical conversion, makes the image taking troublesome and time consuming. To overcome this inconvenience, Japanese Unexamined Patent Publication No. 9(1997)-15760 and Japanese Unexamined Patent Publication No. 9(1997)-15761, for example, teach methods that enable production of photoprocessing reference image control tool photographs simply and quickly by using computer graphics technology to produce photoprocessing reference images.

However, the methods taught by PCT Japanese Publication No. 5(1993)-506733(WO92/15957), Japanese Unexamined Patent Publication No. 9(1997)-15760 and Japanese Unexamined Patent Publication No. 9(1997)-15761 all obtain the final photoprocessing reference image control tool photograph by once recording a composite image of a first image and a second image onto an intermediate recording medium and then photocopying the intermediate recording medium carrying the composite image. This makes production of the photoprocessing reference image control tool photograph very troublesome. A considerably easier method would be to record the composite image onto the final silver halide photographic recording medium without once recording it onto an intermediate recording medium. However, when the composite image is recorded directly onto the final silver halide photographic recording medium, photographing of the original image has to be repeated for each different type of silver halide photographic recording medium. This is impractical in the actual production of prints.

SUMMARY OF THE INVENTION

This invention was accomplished in light of the foregoing problems and has as one of its objects to provide a method of making a photoprocessing reference image control tool photograph that enables simple production of a photoprocessing reference image control tool photograph without need to produce an intermediate recording medium. Another object of the invention is to provide methods of converting image data that utilize the method of making a photoprocessing reference image control tool photograph.

The method of making a photoprocessing reference image control tool photograph according to the invention includes:

step A of acquiring digital (F) image data representing an image of a preselected subject, step B of acquiring first digital chart image data representing a color chart composed of multiple color patches using the same acquisition conditions as those used at the time of acquiring the digital image data, step C of recording. an image of the color chart onto a silver halide photographic recording medium (F), step D of converting the color chart image recorded onto the prescribed silver halide photographic recording medium (F) to second digital chart image data and determining a correspondence relationship defining correspondence of digital signal values of the patches between the first and second digital chart image data, step E of converting the digital image data based on the correspondence relationship to obtain converted image data, and step F of recording a converted image represented by the converted image data onto a silver halide photographic recording medium (G) of the same type as the silver halide photographic recording medium (F) to obtain a photoprocessing reference image control tool photograph.

Step A can be a step of acquiring the digital image data by photographing the subject with a digital image input device and step B can be a step of acquiring the first digital chart image data by photographing the color chart with a digital image input device of the same type.

Step A preferably includes a sub-step A1 of photographing the subject to record an image of the subject onto a first silver halide photographic recording medium and a sub-step A2 of using a device such as a scanner to read and convert the image of the subject recorded onto the first silver halide photographic recording medium to the digital image data and step B preferably includes a sub-step B1 of recording the color chart onto a second silver halide photographic recording medium of the same type as the first silver halide photographic recording medium and a sub-step B2 of using a device such as a scanner to read and convert the color chart image recorded onto the second silver halide photographic recording medium to the first digital chart image data.

The silver halide photographic recording medium (F) is the same type as the silver halide photographic recording medium (G) to be used for the final photoprocessing reference image control tool photograph and, in the case of obtaining the digital image data by recording an image of the subject onto the first silver halide photographic recording medium, can be of the same type as or a different type from the first silver halide photographic recording medium.

As the subject in step A there can be selected a person or other such typical subject frequently photographed by general photographers.

Step B acquires first digital image data representing a color chart using the same acquisition conditions as those used when acquiring the image of the subject. By "same acquisition conditions" is meant that the image of the subject and the color chart are recorded onto the same type of silver halide photographic recording medium, that the exposure conditions are the same and that the photography is conducted using the same model of digital image input device. When the digital image data are obtained by recording the image of the subject onto the first silver halide photographic recording medium, the first silver halide photographic recording medium and the silver halide photographic recording medium (F) can be of the same type or of different types. The color chart preferably includes multiple neutral gray and color patches. ColorChecker, a product of Greta Macbeth, is an example of such a color chart.

"Silver halide photographic recording media of the same type" as termed with respect to the invention means recording media of, for example, identical speed, identical photosensitivity and identical coloration. Taking products of Fuji Photo Film Co., Ltd. as examples, film pairs considered to be different types include Fujicolor SUPER G ACE 400 and SUPER G ACE 100, Fujicolor SUPER G ACE 400 and Fujicolor REALA ACE, Fujichrome ASTIA 100 and Fujichrome PROVIA. Fujicolor SUPER G ACE 400 and Kodak GOLD 400 film (product of Eastman Kodak Company) are also different types.

Step D converts the color chart image recorded onto the silver halide photographic recording medium (F) into the second digital chart image data, samples a digital signal value from each color patch, identifies sampled signal pairs between the first and second digital chart image data and determines a correspondence relationship defining correspondence between these signal values. The form of expression of this correspondence relationship can be, but is not limited to, one-dimensional LUT(look up table), matrix, three-dimensional LUT(look up table) and combinations of these.

Step E converts the digital image data obtained in step A based on the correspondence relationship determined in step D to obtain converted image data. An image of the subject was recorded onto the first silver halide photographic recording medium in step A. In this case, if the first silver halide photographic recording medium and the silver halide photographic recording medium (F) are of the same type, no conversion is effected and the digital image data obtained in step A are used without modification to conduct the processing of step F.

Step F produces the final photoprocessing reference image control tool photograph by using a digital image output device such as a film recorder using a CRT (cathode ray tube) or a laser as a light source to record the converted image data obtained in step E on a silver halide photographic recording medium (G) of the same type as the silver halide photographic recording medium (F).

In the method of making a photoprocessing reference image control tool photograph according to this invention, both the silver halide photographic recording medium (F) and the silver halide photographic recording medium (G) of the same type are preferably color negative films or color reversal films. When first and second silver halide photographic recording media are used, both are preferably color negative films or color reversal films.

A first method of converting image data according to the invention includes:

step A of acquiring digital image data representing an image of a preselected subject, step B of acquiring first digital chart image data representing a color chart composed of multiple color patches using the same acquisition conditions as those used at the time of acquiring the digital image data, step C of recording an image of the color chart onto a silver halide photographic recording medium (F), step D of converting the color chart image recorded onto the silver halide photographic recording medium (F) to second digital chart image data and determining a correspondence relationship defining correspondence of digital signal values of the patches between the first and second digital chart image data, and step E of converting the digital image data based on the correspondence relationship to obtain converted image data.

A second method of converting image data according to the invention includes:

step A of acquiring digital image data representing an image of a preselected subject by photographing the subject using an exposure condition (E), step B of acquiring first digital chart image data representing a color chart composed of multiple color patches by photographing the color chart using an exposure condition (F) the same as the exposure condition (E)

step C of acquiring second digital chart image data representing the color chart by photographing the color chart using an exposure condition (H) different from the prescribed exposure condition (E), step D of determining a correspondence relationship defining correspondence of digital signal values of the patches between the first and second digital chart image data, and step E of converting the digital image data based on the correspondence relationship to obtain converted image data.

In the method of making a photoprocessing reference image control tool photograph according to the invention, the first digital chart image data are acquired using the same acquisition conditions as those used to acquire the digital image data and an image of the color chart is recorded onto a silver halide photographic recording medium (F). Next, a correspondence relationship defining correspondence of the digital signal values of the color chart patches between the first digital chart image data and second color chart image data converted from the color chart recorded onto the silver halide photographic recording medium (F) is then determined. The digital image data are then converted into converted image data based on this correspondence relationship and the converted image data are recorded onto a silver halide photographic recording medium (G) of the same type as the silver halide photographic recording medium (F) to obtain a final photoprocessing reference image control tool photograph. This method of the invention can make the photoprocessing reference image control tool photograph without producing the intermediate recording medium required by the methods taught by PCT Japanese Publication No. 5(1993)-506733, Japanese Unexamined Patent Publication No. 9(1997)-15760 and Japanese Unexamined Patent Publication No. 9(1997)-15761. It therefore enables bother-free production of a photoprocessing reference image control tool photograph. Moreover, no need arises to photograph an original image every time there is a change in the acquisition conditions used to acquire the digital image data because the correspondence relationship defining correspondence between the acquisition conditions and the silver halide photographic recording medium (F) is determined beforehand. This makes it possible to produce photoprocessing reference image control tool photographs with no practical difficulty.

Like the invention method of making a photoprocessing reference image control,tool photograph, the first method of converting image data according to the invention determines a correspondence relationship defining correspondence of the digital signal values of the color chart patches between the first digital chart image data and second color chart image data and converts the digital image data based on the correspondence relationship to obtain converted image data. Digital image data identical with digital image data representing an image photographed on the silver halide photographic recording medium (F) can therefore be obtained merely by acquiring the digital image data, with no need to again photograph the subject on the silver halide photographic recording medium (F).

The second method of converting image data according to the invention photographs a subject using a exposure condition (E) and acquires digital image data representing the image of the subject, photographs a color chart using the same exposure condition (F) and acquires first digital chart image data representing the color chart image, and records the color chart onto a silver halide photographic recording medium (F) using an exposure condition (H) different from that used at the time of acquiring the digital image data. It next determines a correspondence relationship defining correspondence of digital signal values of the color chart patches between the first digital chart image data and second color chart image data obtained by converting the color chart recorded onto the silver halide photographic recording medium (F). It then converts the digital image data based on the correspondence relationship to obtain converted image data. Therefore, if the photographed image of the subject should happen to be underexposed, for example, digital image data representing a properly exposed image can nevertheless be obtained as converted image data, with no need to photograph the same subject a second time, because the color chart image recorded onto the silver halide photographic recording medium (F) with proper exposure is used to determine the correspondence relationship for the data conversion.

BRIEF DESCRIPTION OF THE DRAWINGS

FIG. 3 is part 1 of a chart showing data obtained in a specific example.

FIG. 4 is part 2 of the same chart.

PREFERRED EMBODIMENTS OF THE INVENTION

An embodiment of the invention method of making a photoprocessing reference image control tool photograph will now be explained with reference to the drawings. This embodiment is an application of the invention to production of a photoprocessing reference image control tool photograph for an automatic printer (or print processor) that measures the density of an image recorded onto color negative film and prints the image on printing paper using automatically controlled exposure conditions.

Figure 1:
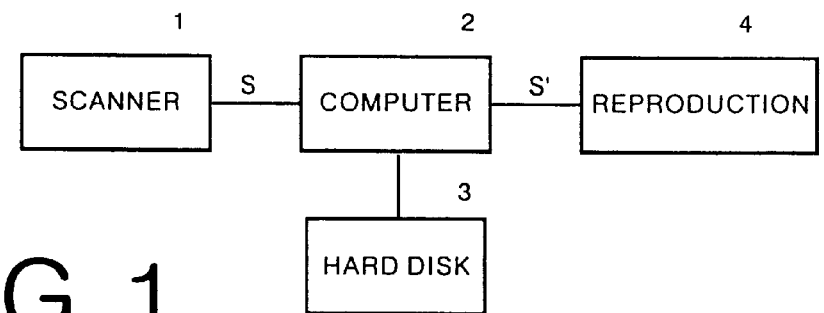
FIG. 1 is a block diagram showing the configuration of a data processing system for carrying out a method of making a photoprocessing reference image control tool photograph that is an embodiment of the invention.

FIG. 1 is a block diagram showing the configuration of a data processing system for carrying out a method of making a photoprocessing reference image control tool photograph that is an embodiment of the invention. The data processing system is composed of a scanner 1 for digitizing an image rendered on a silver halide photographic recording medium to produce digital image data S, a computer 2 for converting the digital image data S input from the scanner 1 and determining a correspondence relationship explained later, a hard disk 3 serving as a memory for storing the digital image data S and converted image data S', and a film recorder or other such reproducing means 4 for reproducing the converted image data S' as a visible image.

The processing steps of the embodiment will now be explained.

Figure 2:
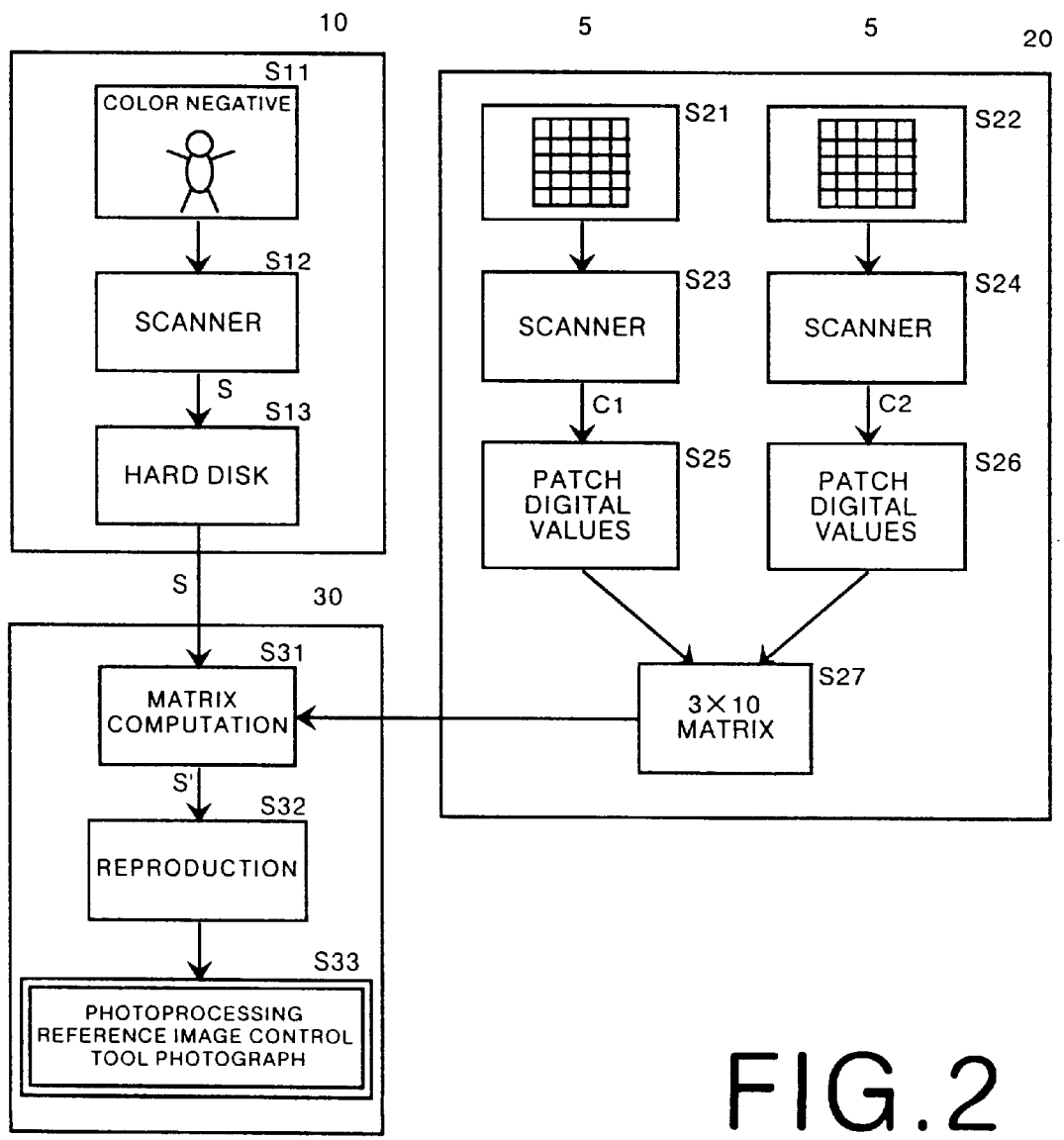
FIG. 2 is a block diagram schematically illustrating the processing steps of the embodiment.

FIG. 2 is a block diagram schematically illustrating the processing steps in accordance with this embodiment of the invention method of making a photoprocessing reference image control tool photograph. The method of making a photoprocessing reference image control tool photograph of this embodiment comprises a step 10 for storing on the hard disk 3 digital image data representing an image of a preselected photographed subject (typically a person as a subject frequently photographed by general photographers), a step 20 for photographing a color chart 5 composed of patches of different colors and determining an image conversion relationship from the digital value of each patch, and a step 30 for effecting the conversion determined in step 20 on the digital image data S obtained in step 10 to produce converted image data S' and recording the converted image data S' onto a silver halide photographic recording medium in the reproducing means 4.

First, in sub-step S11 of step 10, a still camera for taking silver halide photographs is loaded with color negative film and used to photograph a subject (e.g., a person) at proper exposure (particularly for the face portion). The color negative film used to photograph the subject is developed in a film processor to produce a pictorial image on the color negative film. Next, in sub-step 12, the pictorial negative image on the color negative film is read by the scanner 1 while effecting three-color (RGB) color separation, thereby converting the negative image into digitized pictorial image data S. The data for each color can, for example, be generated by dividing the color into 256 gradations between minimum and maximum density and expressing each gradation with 8 data bits. This enables expression of 256×256×256 colors. The digital image data S are stored on the hard disk 3 in sub-step S13.

In sub-step S21 of step 20, a still camera for taking silver halide photographs is loaded with the same type of color negative film as used in sub-step S11 and used to photograph a color chart 5 (ColorChecker, product of Gretag Macbeth). In sub-step S22, the color chart 5 is photographed using color negative film of a different type from that used in sub-steps S11 and S21. The color negative films used to photograph the color chart 5 in sub-steps S21 and S22 are developed in a film processor to produce chart images on the color negative films. Next, in sub-steps S23 and S24, the chart images on the color negative films are read by the scanner 1, using the same method as in sub-step S12, to obtain digital chart image data C1 and C2. Then, in sub-steps S25 and S26, the digital values of the portions of the digital chart image data C1 and C2 corresponding to the patch portions of the chart images are sampled and used to compile digital data sets. Next, in sub-step S27, the method of least squares or the method of multiple regression analysis is used to determine the elements of a 3×10 matrix for converting the set of digital values obtained in sub-step S25 to the set of digital values obtained in sub-step S26.

In sub-step S31 of step 30, the digital image data S stored on the hard disk 3 in sub-step S13 are converted based on the 3×10 matrix obtained in sub-step 27 to obtain converted image data S'. Next, in sub-step S32, the converted image data S' are, in the reproducing means 4, recorded onto the same type of color negative film as that used in sub-step S22 to obtain a photoprocessing reference image control tool photograph.

Thus, the invention enables production of a photoprocessing reference image control tool photograph without need to produce the intermediate recording medium required by the methods of PCT Japanese Publication No. 5(1993)-506733, Japanese Unexamined Patent Publication No. 9(1997)-15760 and Japanese Unexamined Patent Publication No. 9(1997)-15761 explained earlier. A photoprocessing reference image control tool photograph can therefore be made with little bother. Since the matrix defining correspondence between different types of negative films is compiled beforehand, no need arises to photograph an original image every time the type of negative film changes. This makes it possible to produce photoprocessing reference image control tool photographs with no practical difficulty.

A specific example of the invention will now be explained. An image of a subject was photographed using silver halide photosensitive material A. Twenty-four Munsell color chips (product of Nippon Color Research Laboratory) were photographed together with the subject as patches for accuracy verification. The Munsell codes of the color chips used were as follows:

5R4/2, 5R4/10, 5YR7/2 5YR7/10, 5Y8/1, 5Y8/8, 5GY7/1, 5GY7/6, 5G4/2, 5G4/6, 5BG4/2, 5BG4/6, 5B4/2, 5B4/6, 5PB4/1, 5PB4/8, 5P4/1, 5P4/8, 5RP4/2, 5RP4/10, N2, N4, N6, N8

For later accuracy verification, moreover, images of the same subject were photographed using silver halide photosensitive materials B and C of different types from the silver halide photosensitive material A.

Next, the silver halide photosensitive material A and the silver halide photosensitive materials B and C were used to photograph a ColorChecker (product of Gretag Macbeth). Density data were sampled from each patch portion.

Multiple regression analysis was then conducted using the density data obtained in the foregoing manner to determine elements C10–C39 of 3×10 matrices for converting the density data of the silver halide photosensitive material A to the density data of the silver halide photosensitive materials B and C by the following Equation (1). In this equation Db, Dg and Dr represent the densities of the silver halide photosensitive material A and Db', Dg' and Dr' represent the densities of the silver halide photosensitive material B or C.

$$\begin{pmatrix} Db^1 \\ Dg^1 \\ Dr^1 \end{pmatrix} = \tag{1}$$

$$\begin{pmatrix} C10 & C11 & C12 & C13 & C14 & C15 & C16 & C17 & C18 & C19 \\ C20 & C21 & C22 & C23 & C24 & C25 & C26 & C27 & C28 & C29 \\ C30 & C31 & C32 & C33 & C34 & C35 & C36 & C37 & C38 & C39 \end{pmatrix}$$

$$\begin{pmatrix} Db \\ Dg \\ Dr \\ Db^2 \\ Dg^2 \\ Dr^2 \\ Db \cdot Dg \\ Dg \cdot Dr \\ Dr \cdot Db \\ 1 \end{pmatrix}$$

Using the 3×10 matrices obtained in this manner, the densities of the silver halide photosensitive material A were converted by Equation (1) to obtain converted density values (converted image data) corresponding to those that would be obtained if the photograph were taken with silver halide photosensitive materials B and C. Specifically, the density values of the 24 Munsell color chip portions in the silver halide photosensitive material A were converted using the 3×10 matrices to obtain converted density values corresponding to those that would be obtained if the photograph were taken with the silver halide photosensitive materials B and C. The converted density values were then compared with the density values of the 24 Munsell color chip portions in the silver halide photosensitive materials B and C. The results of the comparison are shown in the table bridging FIGS. 3 and 4.

As can be seen from this table, photographing a subject beforehand with the reference silver halide photosensitive material (silver halide photosensitive material A) enabled excellent prediction of the corresponding images that would be obtained if the subject were photographed using different silver halide photosensitive materials (silver halide photosensitive materials B and C). (When the photoprocessing reference image control tool photograph is actually output, output device fluctuations introduce density error in addition to what is shown here.)

The invention has been explained with reference to production of a photoprocessing reference image control tool photograph for use in an automatic printer for printing color negative film images on color paper. It is not limited to this embodiment, however, but can also be applied to production of photoprocessing reference image control tool photographs for other types of automatic printers and print processors.

In the foregoing embodiment, the correspondence between the digital value sets is defined by generating a 3×10 matrix in sub-step S27. However, it is instead possible to use any of various other techniques such as one-dimensional LUT (look up table), matrix, and three-dimensional LUT (look up table) matrix, individually or in combination (including matrices).

Although sub-steps S11, S21, S22 and S32 of the foregoing embodiment use color negative films, they can use color reversal films instead. It is also possible to use color negative films in sub-steps S11 and S21 and color reversal films in sub-steps S22 and S32 or to use color reversal films in sub-steps S11 and S21 and color negative films in sub-steps S22 and S32.

The foregoing embodiment obtains the digital image data S by recording an image of a subject onto film and then reading data from the film. The invention is not limited to this, however, but also encompasses the case of directly acquiring the digital image data S by use of a digital camera or other digital image input device employing a charge-coupled device (CCD). In this case, the digital chart image data C1 of the foregoing embodiment are obtained by photographing the color chart 5 using the same type of digital image input device as was used to obtain the digital image data S. The effortless production of a photoprocessing reference image control tool photograph made possible by the foregoing embodiment is also enjoyed when the subject image and the chart image are obtained using a digital image input device in this manner, i.e., directly without once recording them onto film, because the photoprocessing reference image control tool photograph can be made without need to produce an intermediate recording medium.

An embodiment of the invention method of converting image data will now be explained.

The method of converting image data according to this embodiment of the invention utilizes the technique employed in the method of making a photoprocessing reference image control tool photograph described in the foregoing. Specifically, it is a method of reproducing the converted image data S' obtained in sub-step 31 of the earlier embodiment as a final converted image rather than as a photoprocessing reference image control tool photograph. By this reproduction of the converted image data S' as a final converted image it is possible to obtain a reproduced image like that when photography is conducted using a different type of film merely by photographing the image on the film used in sub-step S11, without need to photograph the image again on the different film.

As in the embodiment of the method of making a photoprocessing reference image control tool photograph, this invention method of converting image data can also be configured to directly acquire the digital image data S by use of a digital camera or other digital image input device employing a CCD. In this case, the digital chart image data C1 are obtained by photographing the color chart 5 using the same type of digital image input device as was used to obtain the digital image data S.

By using the same type of negative film in sub-steps S11, S21 and S22, photographing the color chart in sub-step S21 using the same exposure conditions as those in sub-step S11, photographing the color chart in sub-step 22 using different exposure conditions from those in sub-step 11, generating the 3×10 matrix in sub-step S27 and using the matrix to obtain the converted image data S' in sub-step S31, there can be obtained a reproduced image like what would be obtained by photographing the subject using the different exposure conditions, without need to take another photograph. For instance, when the photograph of the subject taken in sub-step S11 was underexposed, an underexposed photograph of the color chart is taken in sub-step S21, a properly exposed photograph of the color chart is taken in sub-step S22 and the correspondence is determined in the same manner as explained above to obtain the converted image data S'. Converted image data S' representing a properly exposed image can therefore be obtained without taking another photograph of the same subject.

A digital camera or other digital image input device employing a CCD can again be used to acquire the digital image data S directly. In this case, the digital chart image data C1 are obtained using the same exposure. conditions (e.g., underexposure conditions) as those used to obtain the digital image data S and the digital chart image data C2 are obtained using different exposure conditions (e.g., proper exposure conditions) from those used to obtain the digital image data S.

Some silver halide photographic recording media products are designed with emphasis on sensitivity and others with emphasis on granularity or on an important color (e.g., flesh, green or purple). The products of different manufacturers also differ in coloration. Since this method of the invention enables an image photographed with one type of film to be reproduced as if it were taken with a different type of film, it is highly effective in enabling images to be reproduced with the desired color rendering.

What is claimed is:

1. A method of making a photoprocessing reference image control tool photograph comprising:

step A of acquiring digital image data representing an image of a preselected subject, step B of acquiring first digital chart image data representing a color chart composed of multiple color patches using the same acquisition conditions as those used at the time of acquiring the digital image data, step C of recording an image of the color chart onto a silver halide photographic recording medium (F), step D of converting the color chart image recorded onto the silver halide photographic recording medium (F) to second digital chart image data and determining a correspondence relationship defining correspondence of digital signal values of the patches between the first and second digital chart image data, step E of converting the digital image data based on the correspondence relationship to obtain converted image data, and step F of recording a converted image represented by the converted image data on a silver halide photographic recording medium (G) of the same type as the silver halide photographic recording medium (F) to obtain a photoprocessing reference image control tool photograph.

2. A method of making a photoprocessing reference image control tool photograph according to claim 1, wherein step A is a step of acquiring the digital image data by photographing the subject with a digital image input device and step B is a step of acquiring the first digital chart image data by photographing the color chart with a digital image input device of the same type.

3. A method of making a photoprocessing reference image control tool photograph according to claim 1, wherein step A includes sub-step A1 of photographing the subject to record an image of the subject onto a first silver halide photographic recording medium and sub-step A2 of converting the image of the subject recorded onto the first silver halide photographic recording medium to the digital image data and step B includes sub-step B1 of recording the color chart onto a second silver halide photographic recording medium of the same type as the first silver halide photographic recording medium and sub-step B2 of converting the color chart image recorded onto the second silver halide photographic recording medium to the first digital chart image data.

4. A method of making a photoprocessing reference image control tool photograph according to claim 1, wherein the silver halide photographic recording medium (F) and the silver halide photographic recording medium (G) are both color negative films or color reversal films.

5. A method of making a photoprocessing reference image control tool photograph according to claim 3, wherein the first and second silver halide photographic recording media are both color negative films or color reversal films.

6. A method of converting image data comprising:

step A of acquiring digital image data representing an image of a preselected subject, step B of acquiring first digital chart image data representing a color chart composed of multiple color patches using the same acquisition conditions as those used at the time of acquiring the digital image data, step C of recording an image of the color chart onto a silver halide photographic recording medium (F), step D of converting the color chart image recorded onto the silver halide photographic recording medium (F) to second digital chart image data and determining a correspondence relationship defining correspondence of digital signal values of the patches between the first and second digital chart image data, and step E of converting the digital image data based on the correspondence relationship to obtain converted image data.

7. A method of converting image data according to claim 6, wherein step A is a step of acquiring the digital image data by photographing the subject with a digital image input device and step B is a step of acquiring the first digital chart image data by photographing the color chart with a digital image input device of the same type.

8. A method of converting image data according to claim 6, wherein step A includes sub-step A1 of photographing the subject to record an image of the subject onto a first silver halide photographic recording medium and sub-step A2 of converting the image of the subject recorded onto the first silver halide photographic recording medium to the digital image data and step B includes sub-step B1 of recording the color chart onto a second silver halide photographic recording medium of the same type as the first silver halide photographic recording medium and sub-step B2 of converting the color chart image recorded onto the second silver halide photographic recording medium to the first digital chart image data.

9. A method of converting image data comprising:

step A of acquiring digital image data representing an image of a preselected subject by photographing the subject using an exposure condition (E), step B of acquiring first digital chart image data representing a color chart composed of multiple color patches by photographing the color chart using an exposure condition (F) the same as the exposure condition (E), step C of acquiring second digital chart image data representing the color chart by photographing the color chart using an exposure condition (H) different from the exposure condition (E), step D of determining a correspondence relationship defining correspondence of digital signal values of the patches between the first and second digital chart image data, and step E of converting the digital image data based on the correspondence relationship to obtain converted image data.

10. A method of converting image data according to claim 9, wherein step A is a step of acquiring the digital image data by photographing the subject with a digital image input device, step B is a step of acquiring the first digital chart image data by photographing the color chart with a digital image input device of the same type, and step C is a step of acquiring the second digital chart image data by photographing the color chart with a digital image input device of the same type.

11. A method of converting image data according to claim 9, wherein step A includes sub-step A1 of photographing the subject to record an image of the subject onto a first silver halide photographic recording medium and sub-step A2 of converting the image of the subject recorded onto the first silver halide photographic recording medium to the digital image data, step B includes sub-step B1 of recording the color chart onto a second silver halide photographic recording medium of the same type as the first silver halide photographic recording medium and sub-step B2 of converting the color chart image recorded onto the second silver halide photographic recording medium to the first digital chart image data, and step C includes sub-step C1 of recording the color chart onto a third silver halide photographic recording medium of the same type as the first silver halide photographic recording medium and sub-step C2 of converting the color chart image recorded onto the third silver halide photographic recording medium to the second digital chart image data.

* * * * *